(12) United States Patent
Sugaya

(10) Patent No.: US 9,325,367 B2
(45) Date of Patent: Apr. 26, 2016

(54) WIRELESS COMMUNICATION APPARATUS, WIRELESS COMMUNICATION SYSTEM, WIRELESS COMMUNICATION METHOD AND PROGRAM

(71) Applicant: Sony Corporation, Tokyo (JP)

(72) Inventor: Shigeru Sugaya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/821,462

(22) Filed: Aug. 7, 2015

(65) Prior Publication Data

US 2015/0351078 A1    Dec. 3, 2015

Related U.S. Application Data

(63) Continuation of application No. 14/172,960, filed on Feb. 5, 2014, now Pat. No. 9,136,900, which is a continuation of application No. 13/736,601, filed on Jan. 8, 2013, now Pat. No. 8,682,259, which is a continuation of application No. 12/029,851, filed on Feb. 12, 2008, now Pat. No. 8,374,551.

(30) Foreign Application Priority Data

Mar. 8, 2007    (JP) ................................ 2007-058707

(51) Int. Cl.
*H04B 1/40*    (2015.01)
*H04W 76/02*    (2009.01)
(Continued)

(52) U.S. Cl.
CPC  *H04B 1/40* (2013.01); *H04L 5/003* (2013.01); *H04W 8/005* (2013.01); *H04W 48/18* (2013.01); *H04W 72/02* (2013.01); *H04W 76/023* (2013.01); *H04W 84/18* (2013.01)

(58) Field of Classification Search
CPC ......................................................... H04B 1/40
USPC .......................... 455/40, 62, 63, 77, 90.2, 514
See application file for complete search history.

(56) References Cited

U.S. PATENT DOCUMENTS 7,426,396 B2 *   9/2008   Iwasaki ................ H04W 48/16
                                                      455/456.1
7,742,784 B2     6/2010   Sugaya
(Continued)

FOREIGN PATENT DOCUMENTS

JP    2004-274723    9/2004
JP    2003-318802    11/2008

OTHER PUBLICATIONS

U.S. Appl. No. 14/683,856, filed Apr. 10, 2015, Sugaya.
(Continued)

*Primary Examiner* — Tuan H Nguyen
(74) *Attorney, Agent, or Firm* — Oblon, McClelland, Maier & Neustadt, L.L.P.

(57) ABSTRACT

A wireless communication apparatus is provided that performs wireless communication using a specified wireless channel and forms part of an ad hoc wireless network. The device includes a recording portion that records country ID information and recording-time information in to a storage medium, where the recording-time information indicates the time at which the country ID information was recorded in to the storage medium, a time determination portion that uses the recording-time information to determine whether a predetermined time period has elapsed from the time at which the country ID information was recorded, and a channel setting portion that, when the predetermined time period has not elapsed from the time at which the country ID information was recorded in the storage medium, sets a wireless channel to a frequency channel that can be used in the country indicated by the country ID information recorded in the storage medium.

13 Claims, 8 Drawing Sheets

(51) Int. Cl.
  *H04L 5/00* (2006.01)
  *H04W 8/00* (2009.01)
  *H04W 48/18* (2009.01)
  *H04W 72/02* (2009.01)
  *H04W 84/18* (2009.01)

(56) References Cited

U.S. PATENT DOCUMENTS

| | | |
|---|---|---|
| 7,894,853 B2 | 2/2011 | Sugaya |
| 7,948,939 B2 | 5/2011 | Sugaya et al. |
| 8,064,950 B2 | 11/2011 | Sugaya |
| RE45,469 E | 4/2015 | Sugaya |
| 2006/0046721 A1 | 3/2006 | Sernan-Dez Arppe et al. |
| 2007/0298816 A1 | 12/2007 | Chu et al. |
| 2011/0059722 A1 | 3/2011 | Abdel-Kader et al. |
| 2011/0116613 A1* | 5/2011 | Hlin ............... H04M 1/274566 379/142.06 |

OTHER PUBLICATIONS

U.S. Appl. No. 14/821,462, filed Aug. 7, 2015, Sugaya.

* cited by examiner

FIG.5

| CHANNEL | FREQUENCY HOPPING SUB-BAND ID → TIME | | | | | |
|---|---|---|---|---|---|---|
| CODE 1 | FIRST SUB-BAND | SECOND SUB-BAND | THIRD SUB-BAND | FIRST SUB-BAND | SECOND SUB-BAND | THIRD SUB-BAND |
| CODE 2 | FIRST SUB-BAND | THIRD SUB-BAND | SECOND SUB-BAND | FIRST SUB-BAND | THIRD SUB-BAND | SECOND SUB-BAND |
| CODE 3 | FIRST SUB-BAND | FIRST SUB-BAND | SECOND SUB-BAND | SECOND SUB-BAND | THIRD SUB-BAND | THIRD SUB-BAND |
| CODE 4 | FIRST SUB-BAND | FIRST SUB-BAND | THIRD SUB-BAND | THIRD SUB-BAND | SECOND SUB-BAND | SECOND SUB-BAND |
| CODE 5 | FIRST SUB-BAND | FIRST SUB-BAND | FIRST SUB-BAND | FIRST SUB-BAND | FIRST SUB-BAND | FIRST SUB-BAND |
| CODE 6 | SECOND SUB-BAND | SECOND SUB-BAND | SECOND SUB-BAND | SECOND SUB-BAND | SECOND SUB-BAND | SECOND SUB-BAND |
| CODE 7 | THIRD SUB-BAND | THIRD SUB-BAND | THIRD SUB-BAND | THIRD SUB-BAND | THIRD SUB-BAND | THIRD SUB-BAND |

WIRELESS COMMUNICATION APPARATUS, WIRELESS COMMUNICATION SYSTEM, WIRELESS COMMUNICATION METHOD AND PROGRAM

CROSS REFERENCE TO RELATED APPLICATIONS

This application is a continuation of U.S. application Ser. No. 14/172,960, filed Feb. 5, 2014, which is a continuation of U.S. application Ser. No. 13/736,601, filed Jan. 8, 2013, now U.S. Pat. No. 8,682,259, issued Mar. 25, 2014, which is a continuation of U.S. application Ser. No. 12/029,851, filed Feb. 12, 2008, now U.S. Pat. No. 8,374,551, issued Feb. 12, 2013, which claims the benefit of priority to JP 2007-058707, filed in the Japanese Patent Office on Mar. 8, 2007, all of which are incorporated herein by reference in their entirety.

BACKGROUND OF THE INVENTION

1. Field of the Invention

The invention relates to a wireless communication apparatus, a wireless communication system, a wireless communication method and a program.

2. Description of the Related Art

The WiMedia Alliance has developed the Distributed Media Access Control for Wireless Network and the Multi-band OFDM Physical Layer Specification as access control standards for ultra wide band (UWB) wireless communication. These specifications describe a method for use with wireless communication apparatuses forming a Multi-band OFDM wireless communication system. In this method, UWB wireless communication is performed by hopping multiple frequency bandwidths in a specific pattern.

In recent years, UWB wireless communications are being approved in more and more countries around the world, while legal systems in each country differ and the frequency bandwidths approved for use in Japan, Europe, Asia and other regions also differ. Also, specific countries have time limit measures in place that approve the use of certain frequency bandwidths for a limited period of time. It is therefore necessary for wireless communication apparatuses to use the frequency bandwidths (wireless channels) that are approved by the country in which the wireless communication apparatus is located.

An example of a technology related to the current situation, namely, a communication system that operates in accordance with the position of a cellular telephone, is disclosed, for example, in Japanese Patent Application Publication No. JP-A-2003-318802. To explain in more detail, in JP-A-2003-318802, a communication system is disclosed in which a cellular telephone obtains location information from a cellular telephone base station, and operates based on the circuit information and a program that can be used in that location, as indicated by the obtained location information.

SUMMARY OF THE INVENTION

However, an ad hoc network operates without using a signal from a communications equipment that corresponds to a base station forming part of a typical communications system, and so it is not possible to acquire information from the communications equipment corresponding to the base station relating to the position of a wireless communication apparatus forming part of an ad hoc network. Also, a wireless communication apparatus is sometimes carried to a different country by a user. Therefore, even if country ID information is set once for the country in which the wireless communication apparatus is located, the reliability of the country ID information cannot be maintained with the passing of time.

The present invention addresses the above-identified problems and provides a new and improved wireless communication apparatus that can set a wireless channel based on highly reliable country ID information, a wireless communication system, a wireless communication method and a program for use in an ad hoc network.

According to an embodiment of the present invention, there is provided a wireless communication apparatus that performs wireless communication using a specified wireless channel and that forms part of an ad hoc network. The wireless communication apparatus includes a recording portion that records country ID information indicating a country on the earth in to a storage medium, and that further records in to the storage medium recording-time information indicating the time at which the country ID information is recorded in to the storage medium, a time determination portion that, at the start-up of the wireless communication apparatus, uses the recording-time information to determine whether or not a predetermined time period has elapsed from the time at which the country ID information was recorded in to the storage medium, and a channel setting portion that, when it is determined that the predetermined time period has not elapsed from the time at which the country ID information was recorded in the storage medium, sets a wireless channel to a frequency channel that can be used in the country indicated by the country ID information recorded in the storage medium.

According to the present structure, the recording portion, for example, records both the country ID information input by the user and the current time as the recording-time information. The time determination portion determines whether or not the country ID information has been recorded in the storage medium, and based on the recording-time information, determines whether or not the predetermined time period has elapsed from the time at which the country ID information was recorded in the storage medium. If the time determination portion determines that the predetermined time period has not elapsed since the country ID information was recorded in the storage medium, the channel setting portion sets the wireless channel to a frequency channel that can be used in the country indicated by the country ID information recorded in the storage medium. In other words, the wireless communication apparatus can set the wireless channel to a frequency channel based on the country ID information within a predetermined time period from the time at which the country ID information is recorded. Here, if the predetermined time period is set in accordance with the frequency at which the country in which the wireless communication apparatus is located changes, the country ID information recorded within the predetermined time period generally indicates the country in which the wireless communication apparatus is currently located. Therefore, as the wireless communication apparatus operates based on the elapsed time period from the time at which the country ID information was set up, wireless communication can be performed using an appropriate wireless channel based on highly reliable country ID information.

Further provided are a receiving portion that receives a signal transmitted by another wireless communication apparatus, and an extraction portion that extracts the country ID information of the other wireless communication apparatus from the signal received by the receiving portion. If the time determination portion determines that the country ID information is not recorded in the storage medium or that the predetermined time period has elapsed from the time at which the country ID information was recorded in the storage medium, the channel setting portion may set the wireless channel based on the country ID information of the other wireless communication apparatus extracted by the extraction portion. Here, if the predetermined time period has elapsed from the time at which the country ID information was recorded in the storage portion, it is possible that the country indicated by the country ID information does not match the country in which the wireless communication apparatus is currently located. In this type of case, the wireless communication apparatus, as described above, can automatically set the wireless channel based on the country ID information of the peripheral other wireless communication apparatus, and perform wireless communication.

A display portion may also be provided that displays a country ID information input screen if the time determination portion determines that the country ID information is not recorded in the storage medium or that the predetermined time period has elapsed from the time at which the country ID information was recorded in the storage medium. According to the present structure, the wireless communication apparatus user can input the country ID information for the country in which the user or the wireless communication apparatus is currently located via the country ID information input screen displayed on the display portion. As a result, the wireless communication apparatus can set the wireless channel based on extremely reliable country ID information.

A display portion may also be provided that displays a country ID information input screen if the other wireless communication apparatus country ID information extracted by the extraction portion differs from the country ID information recorded in the storage medium. According to the present structure, the wireless communication apparatus user can input the country ID information for the country in which the user or the wireless communication apparatus is currently located via the country ID information input screen displayed on the display portion. As a result, the wireless communication apparatus can set the wireless channel based on extremely reliable country ID information.

If the manually input country ID information of the other wireless communication apparatus extracted by the extraction portion differs from the country ID information that is recorded in the storage medium based on manual input, the channel setting portion may set the wireless channel to a frequency channel that can be used in both the countries indicated by the country ID information of the other wireless communication apparatus and the country ID information recorded in the storage medium. For example, if the wireless communication apparatus communicates with the other wireless communication apparatus across a national border, the country ID information of the wireless communication apparatus and the country ID information of the other wireless communication apparatus sometimes differ. Here, if the wireless communication apparatus country ID information differs from the other wireless communication apparatus country ID information, the wireless communication apparatus can set the wireless channel to a frequency channel that can be used in both the countries indicated by both sets of country ID information, and communicate with the other wireless communication apparatus located in a different country.

A display portion may also be provided that displays a country ID information screen if the manually input country ID information of the other wireless communication apparatus extracted by the extraction portion differs from the country ID information that is recorded in the storage medium based on manual input. According to the present structure, the wireless communication apparatus user can input the country ID information for the country in which the user or the wireless communication apparatus is currently located via the country ID information input screen displayed on the display portion. As a result, the wireless communication apparatus can set the wireless channel based on extremely reliable country ID information.

If the manually input country ID information of the other wireless communication apparatus extracted by the extraction portion differs from the country ID information recorded in the storage medium, and if the manually input information chronologically precedes the recording of the country ID information in the storage medium, the recording portion may update the country ID information recorded in the storage medium to the country ID information of the other wireless communication apparatus and the channel setting portion may set the wireless channel based on the country ID information recorded in the storage medium. Here, the reliability of the most recently input country ID information is sometimes higher. If the manual input chronologically precedes the recording of the country ID information in to the storage medium, by updating the country ID information recorded in the storage medium to the country ID information of the other wireless communication apparatus, the reliability of the country ID information can be improved.

According to another embodiment of the present invention, there is also provided a wireless communication system that includes a plurality of wireless communication apparatuses that perform wireless communication using a specified wireless channel and that form an ad hoc network. Each of the wireless communication apparatuses forming part of the wireless communication system includes: a recording portion that records country ID information indicating a country on the earth in to a storage medium, and that further records in to the storage medium recording-time information indicating the time at which the country ID information was recorded in to the storage medium; a transmitting portion that transmits a signal that includes the country ID information recorded in the storage medium, a receiving portion that receives a signal transmitted by another wireless communication apparatus, an extraction portion that extracts the other wireless communication apparatus country ID information from the signal received by the receiving portion, a time determination portion that, at the start-up of the wireless communication apparatus, determines whether or not a predetermined time period has elapsed from the time at which the country ID information was recorded in to the storage medium, and a channel setting portion that, when the time determination portion determines that the country ID information is not recorded in the storage medium, or that the predetermined time period has elapsed from the time at which the country ID information was recorded in the storage medium, sets a wireless channel based on the other wireless communication apparatus country ID information extracted by the extraction portion.

According to another embodiment of the present invention, there is provided a wireless communication method including the steps of recording country ID information that indicates a country on the earth in to a storage medium and further recording recording-time information in to the storage medium, where the recording-time information indicates the time at which the country ID information was recorded in to the storage medium. The wireless communication method further includes the step of determining, at the start-up of the wireless communication apparatus, whether or not a predetermined time period has elapsed from the time at which the country ID information was recorded, and, when it is determined that the predetermined time period has not elapsed from the time at which the country ID information was recorded in to the storage medium, the step of setting the wireless communication apparatus wireless channel for wireless communication to a frequency channel that can be used in the country indicated by the country ID information recorded in the storage medium.

According to another embodiment of the present invention, there is provided a program including instructions that command a computer to function as a wireless communication apparatus, the wireless communication apparatus performing wireless communication using a specified wireless channel and forming part of an ad hoc wireless network. The wireless communication apparatus includes a recording portion that records country ID information indicating a country on the earth in to a storage medium, and that further records recording-time information in to the storage medium, the recording-time information indicating the time at which the country ID information was recorded in to the storage medium. The wireless communication apparatus further includes a time determination portion that, at the start-up of the wireless communication apparatus, determines whether or not a predetermined time period has elapsed from the time at which the recording-time information (indicating the time at which the country ID information was recorded in to the storage medium) was recorded, and a channel setting portion that, when it is determined that the predetermined time period has not elapsed from the time at which the country ID information was recorded in the storage medium, sets a wireless channel to a frequency channel that can be used in the country indicated by the country ID information that is recorded in the storage medium.

The program, for example, can cause computer hardware resources including a CPU, ROM or RAM and so on, to execute the above-described functions, including the recording portion, the time determination portion and the channel setting portion functions. In other words, the program can cause a computer using the program to function as the above-described wireless communication apparatus.

According to the embodiments of the present invention described above, it is possible to set a wireless channel for an ad hoc network based on highly reliable country ID information.

BRIEF DESCRIPTION OF THE DRAWING(S)

FIG. 5 is an explanatory diagram showing an example of a structure of a frequency hopping pattern for MultiBand OFDM wireless communication;

DETAILED DESCRIPTION OF THE PREFERRED EMBODIMENT(S)

Figure 1:
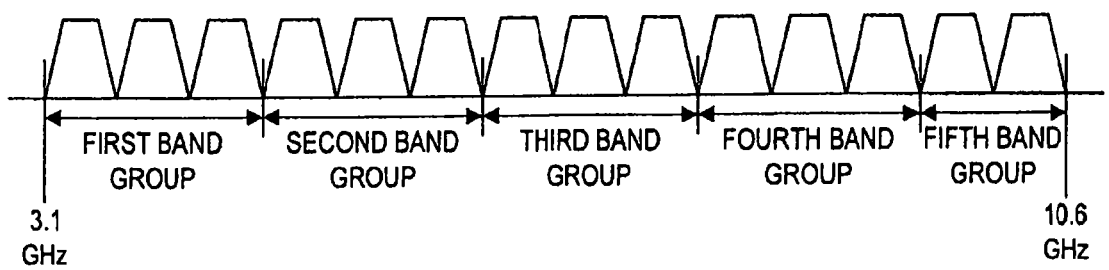
FIG. 1 is an explanatory diagram showing the relationship between band groups and sub-bands that can be used for MultiBand OFDM wireless communication in the USA.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In the explanation of the present embodiment, after explaining the frequency bandwidths that can be used in the USA, Japan and other countries with reference to FIG. 1 to FIG. 4, a specific example of a MultiBand OFDM wireless communication frequency hopping pattern will be explained with reference to FIG. 5. Next, the data structure of the information used in the present embodiment will be explained with reference to FIG. 6 and FIG. 7, and then the structure of the wireless communication apparatus 10 according to the present embodiment will be explained with reference to FIG. 8. Finally, an explanation will be given of a wireless communication method that is executed using the wireless communication apparatus 10 with reference to FIG. 9 and FIG. 10.

FIG. 1 is an explanatory diagram showing the relationship between band groups and sub-bands that can be used for MultiBand OFDM wireless communication in the USA. In the USA, transmissions are allowed at a certain signal level or lower (−42 dBm) in the 3.1 GHz to 10.6 GHz bandwidth. Therefore, a first band group to a fifth band group have been defined based on the 3.1 GHz to 10.6 GHz frequency bandwidth.

Here, as the MultiBand OFDM wireless communication method executes hopping of three sub-bands, it is necessary for the first band group, for example, to include three sub-hands. Therefore, as shown in FIG. 1, the first band group, the second band group, the third band group and the fourth band group are defined in units of three sub-bands, in order from the lowest frequency sub-band upwards.

The sub-band with the highest frequency and the sub-band with the second-highest frequency are defined as the fifth band group.

Figure 2:
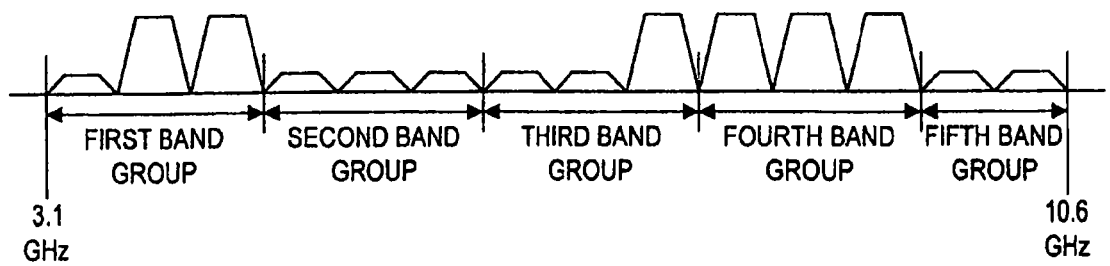
FIG. 2 is an explanatory diagram showing the relationship between band groups and sub-bands that can be used for MultiBand OFDM wireless communication in Japan.

FIG. 2 is an explanatory diagram showing the relationship between band groups and sub-bands that can be used for MultiBand OFDM wireless communication in Japan. In Japan, some frequency bandwidths are assigned to existing primary duties, including measurements by radio astronomical observatories and earth exploration satellites. In order to minimize the effects of interference with bandwidths used for other applications, the band groups and sub-bands that can be used for MultiBand OFDM wireless communication within Japan are limited in comparison to the USA.

Specifically, in Japan, as of September 2006, and as shown in FIG. 2, use of the sub-band with the lowest frequency of the sub-bands forming the first band group, use of all the (three) sub-bands forming the second band group, use of the sub-band with the lowest frequency and of the sub-band with the second lowest frequency of the sub-bands forming the third band group, and use of all the (two) sub-bands forming the fifth band group is restricted.

As described above, Time Frequency Interleaving (TFI) by the MultiBand OFDM wireless communication method requires 3 sub-bands, so within Japan, MultiBand OFDM wireless communication can be performed using the fourth band group.

Figure 3:
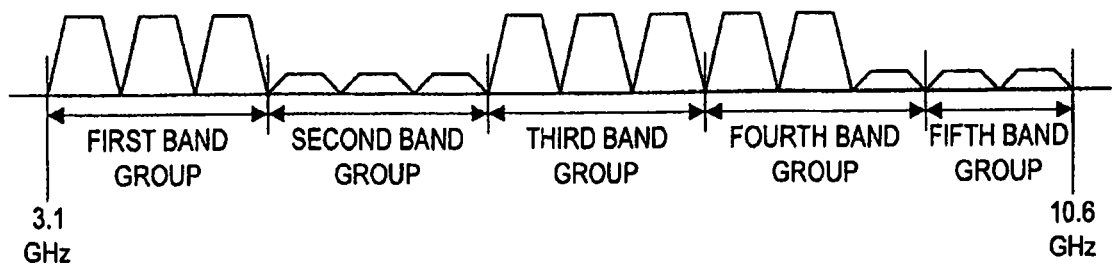
FIG. 3 is an explanatory diagram showing the relationship between band groups and sub-bands that can be used for MultiBand OFDM wireless communication in Europe.

FIG. 3 is an explanatory diagram showing the relationship between band groups and sub-bands that can be used for MultiBand OFDM wireless communication in Europe. In Europe, some bandwidths are assigned to existing communication systems, including cellular telephone operators and broadcasters. In order to minimize the effects of interference with bandwidths used for other applications, the band groups and sub-bands that can be used for MultiBand OFDM wireless communication within Europe are limited in comparison to the USA.

Specifically, in Europe, as of September 2006, and as shown in FIG. 3, use of all the (three) sub-bands forming the second band group, use of the sub-band with the highest frequency of the sub-bands forming the fourth band group, and use of all the (two) sub-bands forming the fifth band group is restricted.

As described above, Time Frequency Interleaving (TFI) by the MultiBand OFDM wireless communication method requires 3 sub-bands, so within Europe, MultiBand OFDM wireless communication can be performed using the first or the third band group.

Figure 4:
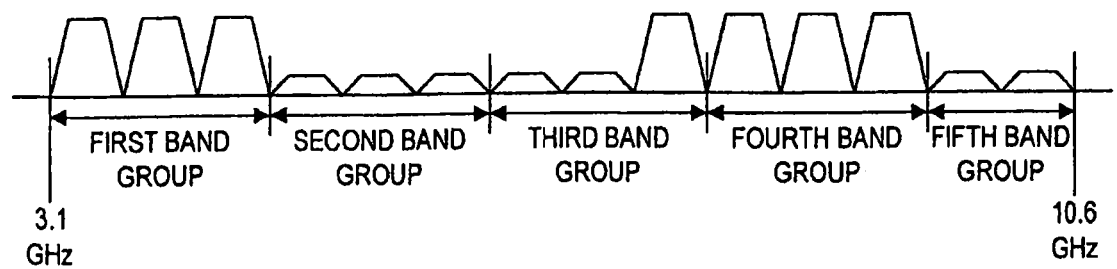
FIG. 4 is an explanatory diagram showing the relationship between band groups and sub-bands that can be used for MultiBand OFDM wireless communication in Asian countries.

FIG. 4 is an explanatory diagram showing the relationship between band groups and sub-bands that can be used for MultiBand OFDM wireless communication in Asian countries. In Asian countries, frequency bandwidths are assigned to applications with reference to Japan's legal system, and therefore the band groups and sub-bands that can be used are similar to the band groups and sub-bands that can be used in Japan.

Specifically, in Asian countries, as shown in FIG. 4, use of all the (three) sub-bands forming the second band group, use of the sub-band with the lowest frequency and of the sub-band with the second lowest frequency of the sub-bands forming the third band group, and use of all the (two) sub-bands forming the fifth band group is restricted.

As described above, Time Frequency Interleaving (TFI) by the MultiBand OFDM wireless communication method requires 3 sub-bands, so in Asian countries, MultiBand OFDM wireless communication can be performed using the first or the fourth band group.

As explained with reference to FIG. 1 to FIG. 4, the band groups and sub-bands that can be used for MultiBand OFDM wireless communication differ from country to country. Also, a wireless communication apparatus must perform wireless communication by adopting as a wireless channel a band group that can be used in the country in which the wireless communication apparatus is located. Therefore, when a wireless communication apparatus for which the wireless channel has been set up based on the band groups that can be used in a certain country is moved to a different country, the wireless communication apparatus may no longer be able to use the previously set wireless channel to perform wireless communication in the country to which it has been moved. For example, if a wireless communication apparatus that has been set up to use the second band group in the USA is moved to Japan, the wireless communication apparatus is no longer able to perform wireless communications using the second band group.

In response to the above problem, an approach could be used in which a position monitoring system, such as the Global Positioning System (GPS) or the like is built in to a wireless communication apparatus. The GPS successively obtains the location of the country in which the wireless communication apparatus is located, and the wireless channel is set in accordance with a band group that can be used in the country for which the location information has been obtained. However, depending on the user, the wireless communication apparatus may not be moved over a national border, and it is therefore not efficient to build GPS in to the wireless communication apparatus to carry out automatic wireless channel setting depending on the country. The wireless communication apparatus according to the present embodiment will be explained in further detail later, and a particular feature of the invention is that it allows appropriate wireless channel settings to be made without the need for a built-in GPS or other position monitoring system.

Further, as shown in FIG. 1. to FIG. 4., of the first through fifth band groups, there is no band group that can be used in all countries. On the other hand, when looking at the situation in terms of sub-bands, it can be seen that the sub-band with the highest frequency of the sub-bands forming the third band group, the sub-band with the lowest frequency of the sub-bands forming the fourth band group, and the sub-band with the second lowest frequency of the sub-bands forming the fourth band group can be used in all countries. Therefore, a method is proposed where the above-mentioned three sub-bands are used as universal sub-brands that can be used in all countries. In the present specification, the wireless communication apparatus according to the present embodiment will be explained on the assumption that the above sub-bands have been approved for common use in all countries.

The wireless communication apparatus according to the present embodiment, as explained above, sets the wireless channel to a band group that can be used in the country in which the wireless communication apparatus is located. Further, the wireless communication apparatus performs wireless communication by hopping the sub-bands that form the wireless channel. More specifically, the wireless communication apparatus, after performing wireless communication using one of the sub-bands that forms the wireless communication channel over a fixed period of time, changes the sub-band being used and performs wireless communication for a fixed period of time, and repeats this operation. By providing diverse frequency hopping patterns to be used as sub-band switch patterns, it is possible to avoid interference with other wireless communication apparatuses that are using the same band group for wireless communication. Below, an example of a frequency hopping pattern will be explained with reference to FIG. 5.

FIG. 5 is an explanatory diagram showing an example of a structure of a frequency hopping pattern for MultiBand OFDM wireless communication. In the MultiBand OFDM wireless communication method, a total of 7 physical channels are available as frequency hopping patterns for 3 sub-bands. Each of the sub-bands used in the explanation below, namely the first sub-band, the second sub-band and the third sub-band, form a same band group and each sub-band differs from the others.

For example, the physical channel defined by Code 1 (the frequency hopping pattern) is a pattern in which the first sub-band, the second sub-band and the third sub-band that form a certain band group are switched in a repeating pattern, as follows: first sub-band, second sub-band, third sub-band, first sub-band, second sub-band, third sub-band and so on.

The physical channel defined by Code 2 is a pattern in which the first sub-band, the second sub-band and the third sub-band that form a certain band group are switched in a repeating pattern as follows: first sub-band, third sub-band, second sub-band, first sub-band, third sub-band, second sub-band and so on.

The physical channel defined by Code 3 is a pattern in which the first sub-band, the second sub-band and the third sub-band that form a certain band group are switched in a repeating pattern as follows: first sub-band, first sub-band, second sub-band, second sub-band, third sub-band, third sub-band and so on.

The physical channel defined by Code 4 is a pattern in which the first sub-band, the second sub-band and the third sub-band that form a certain band group are switched in a repeating pattern as follows: first sub-band, first sub-band, third sub-band, third sub-band, second sub-band, second sub-band and so on.

The physical channel defined by Code 5 is a pattern in which frequency hopping of the first sub-band, the second sub-band and the third sub-band that form a certain band group is not performed, and the first sub-band is used continuously.

The physical channel defined by Code 6 is a pattern in which frequency hopping of the first sub-band, the second sub-band and the third sub-band that form a certain band group is not performed, and the second sub-band is used continuously. In the same way, the physical channel defined by Code 7 is a pattern in which frequency hopping of the first sub-band, the second sub-band and the third sub-band that form a certain band group is not performed, and the third sub-band is used continuously.

In this way, a diverse number of MultiBand OFDM wireless communication frequency hopping patterns are available. By using the frequency hopping patterns defined by codes differing for each wireless network, interference is minimized, and a limited frequency bandwidth can be efficiently used. Next, an explanation will be given of the information that is transmitted and received using the wireless communication apparatus with MultiBand OFDM wireless communication.

Figure 6:
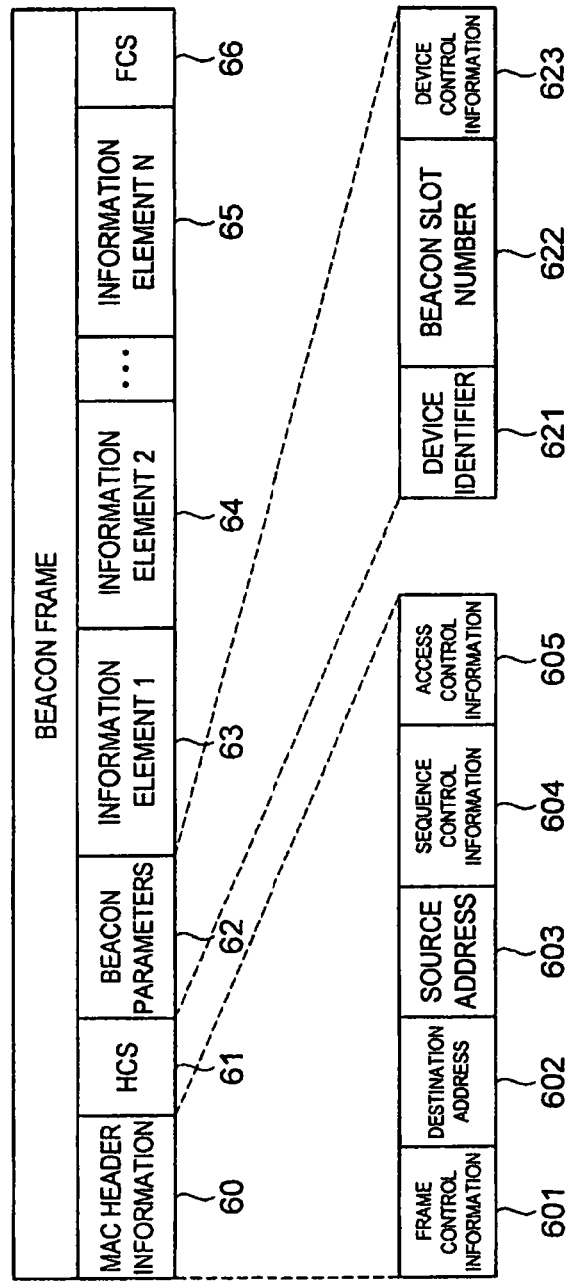
FIG. 6 is an explanatory diagram showing an example of a structure of a beacon frame for beacons transmitted and received between wireless communication apparatuses in an ad hoc network.

In an ad hoc network, there is no base station for unified control of communications. Therefore, methods have been proposed in which wireless communication apparatuses that form part of an ad hoc network transmit and receive beacons used as mutual communication control information, in order to realize ad hoc wireless communication. FIG. 6 shows an example of the structure of a beacon frame that contributes to the establishment of ad hoc wireless communication in the above way.

FIG. 6 is an explanatory diagram showing an example of a structure of a beacon frame for beacons transmitted and received between wireless communication apparatuses in an ad hoc network. The beacon frame includes established control information, including a MAC header information 60, a header check sequence (HCS) 61, beacon parameters 62, an information element (1) 63, an information element (2) 64, an information element (N) 65 and a frame check sequence (FCS) 66.

The MAC header information 60 further includes frame control information 601, a destination address 602 that identifies the receiving wireless communication apparatus, a source address 603 that identifies the transmitting wireless communication apparatus, sequence control information 604 including a sequence number and the like, and access control information 605 that holds the parameters necessary for access control and the like.

The beacon parameters 62 further include a device identifier 621 that holds the wireless communication apparatus MAC address information and the like, a beacon slot number 622 that indicates the beacon slot being used by the wireless communication apparatus to transmit the beacon, and device control information 623 that includes information unique to the wireless communication apparatus.

In addition, information elements can be added freely to the beacon frame as payload information, and, as an example of information elements, FIG. 6 shows the information element (1) 63, the information element (2) 64, and the information element (N) 65. The N referred to here indicates the number of information elements added to the beacon and transmitted, and the number of information elements N may differ with each beacon that is transmitted.

The frame check sequence (FCS) 66 is information used to detect errors in the beacon frame. The beacon frame 20 may be structured such that each of the above parameters can be added or deleted as necessary. An example of a specific information element structure will next be explained with reference to FIG. 7.

Figure 7:
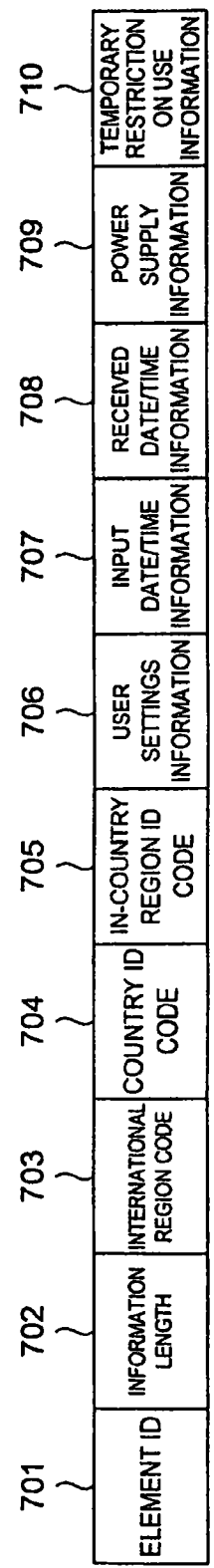
FIG. 7 is an explanatory diagram showing an example of a structure of a country ID code information element as an example of an information element.

FIG. 7 is an explanatory diagram showing an example of a structure of a country ID code information element as an example of an information element. The country ID information element includes an element ID 701, an information length 702, an international region code 703, a country ID code 704, an in-country region ID code 705, user settings information 706, input date/time information 707, received date/time information 708, power supply information 709, and temporary restriction on use information 710.

The element ID 701 is ID information attached to each of the information elements and that indicates what each information element is related to. Therefore, the element ID 701 shown in FIG. 7 indicates a country ID code information element. The information length 702 indicates the data size of the country ID code information element.

The international region code 703 is information that indicates major regions on the earth (North America, South America, Northern Europe, Europe, Asia, Africa, Australia and so on), and can be obtained, for example, from manual input by a user or from peripheral wireless communication apparatuses. The major region of the world indicated by the international region code 703 is handled, for example, as the region in which the wireless communication apparatus is currently located.

The country ID code 704 is country ID information that indicates an individual country (Japan, the USA, Great Britain, Germany, China and so on), and can be obtained, for example, from manual input by a user or from peripheral wireless communication apparatuses. The country indicated by the country ID code 704, is handled, for example, as the country in which the wireless communication apparatus is currently located.

The in-country region ID code 705 indicates a more detailed region relating to the country indicated by the country ID code 704 (the Kanto region, the Chubu region, the Kinki region, Kyushu, Shikoku, Hokkaido, New York State, Washington State and so on), and can be obtained, for example, from manual input by a user or from peripheral wireless communication apparatuses. The more detailed region in the country indicated by the in-country region ID code 705 is handled, for example, as the region in which the wireless communication apparatus is currently located.

The user settings information 706 is information that indicates whether the above-described international region code 703, the country ID code 704, and the in-country region ID code 705 and so on have been directly set up through manual input by a user, or have been set up based on information obtained from a peripheral wireless communication apparatus.

When the above-described international region code 703, the country ID code 704 and the in-country region ID code 705 and so on have been setup based on manual input by the user, the input date/time information 707 is recording-time information that indicates the time at which manual input by the user was performed, where the recording-time information includes the month, date and time.

For example, the input date/time information 707 may indicate the time as it is at the time of manual input by the user, may indicate the time period that has elapsed from the time at which the time was manually input by the user, may be a timer value where the countdown started at the time at which the time was manually input by the user, or may be information that indicates whether a predetermined amount of time has elapsed or not from the time at which the time was manually input by the user. The input date/time information 707 may also be information that indicates the time at which the international region code 703, the country ID code 704 and the in-country region ID code 705 and so on were setup by manual input by the user.

When the above-described international region code 703, the country ID code 704 and the in-country region ID code 705 and so on have been set up based on information received from a peripheral wireless communication apparatus, the received date/time information 708 is recording-time information that indicates the time at which the information was received, the recording-time information including the month, date and time.

For example, the received input date/time information 708, in the same way as the input date/time information 707, may indicate the time at which the information was received, may indicate the time period that has elapsed from the time at which the information was received, may be a timer value where the countdown started at the time at which the information was received, or may be information that indicates whether a predetermined amount of time has elapsed or not from the time at which the information was received. The received date/time information 708 may also be information that indicates the time at which the international region code 703, the country ID code 704 and the in-country region ID code 705 and so on were set up based on information received from a peripheral wireless communication apparatus.

The power supply information 709 indicates the status of the power supply for the wireless communication apparatus, while the temporary restriction on use information 710 is information that shows that the use of the wireless communication or the band group is temporarily restricted. Each of the above-described data that form the country ID code information element may be added or deleted as necessary. Also, the wireless communication apparatus may be set up to transmit a beacon that does not include a country ID code information element, and to include the country ID code information element in the beacon and transmit it if there is a request from another wireless communication apparatus to include the country ID code information element.

An explanation has been given above of the frequency bandwidths and information used in an ad hoc network. Next, the functions and operations of the wireless communication apparatuses that form the ad hoc network will be explained with reference to FIG. 8 to FIG. 11.

Figure 8:
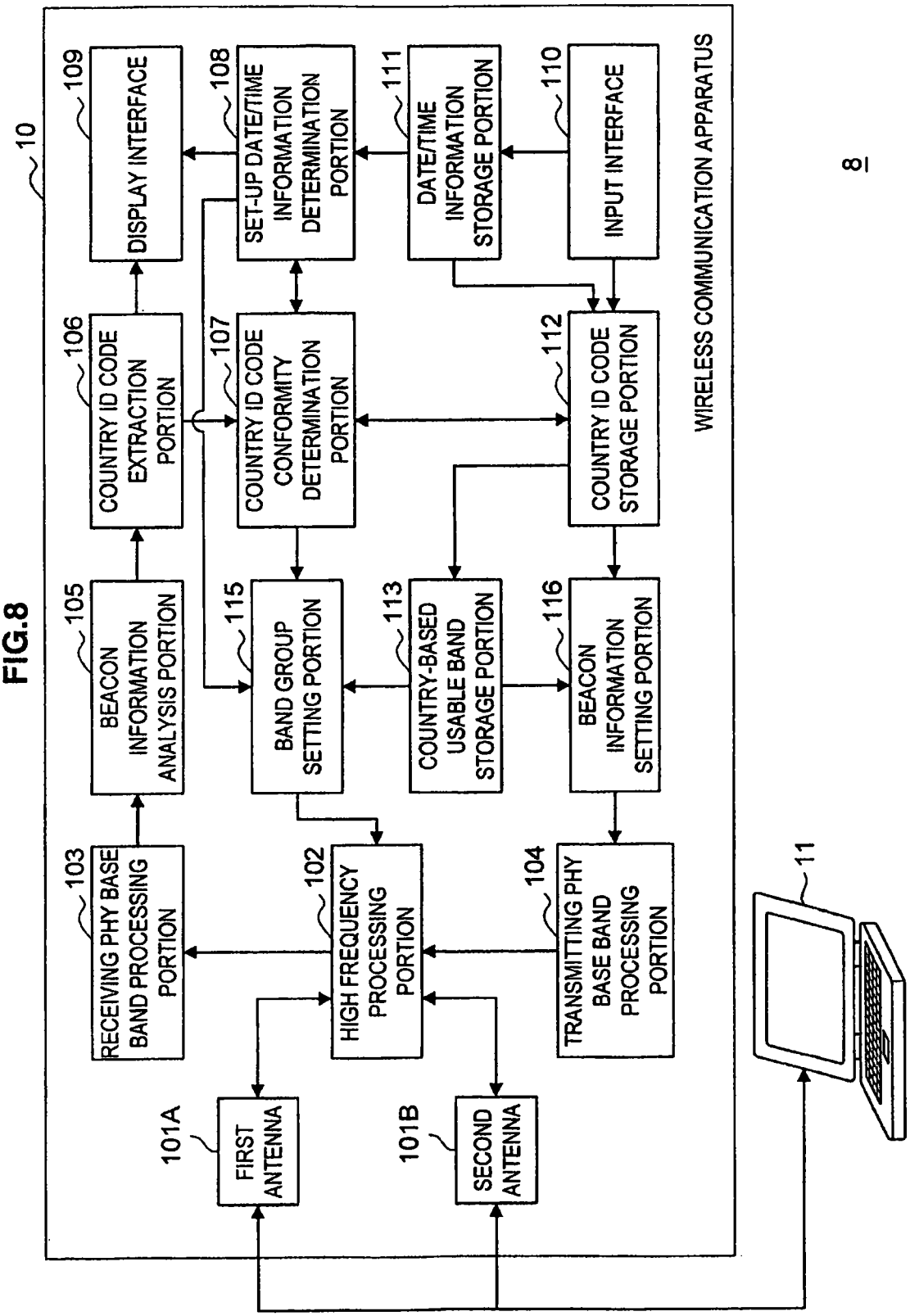
FIG. 8 is a functional block diagram showing the structure of a wireless communication apparatus according to a first embodiment of the present invention.

FIG. 8 is a functional block diagram showing the structure of a wireless communication apparatus 10 according to the present embodiment. The wireless communication apparatus 10 according to the present embodiment, together with at least one other peripheral wireless communication apparatus 11, forms an ad hoc network (a wireless communication system 8) and can perform wireless communication using an appropriate band group.

This type of wireless communication apparatus 10 includes a first antenna 101A, a second antenna 101B, a high frequency processing portion 102, a receiving PHY base band processing portion 103, a transmitting PHY base band processing portion 104, a beacon information analysis portion 105, a country ID code extraction portion 106, a country ID code conformity determination portion 107, a set-up date/time information determination portion 108, a display interface 109, an input interface 110, a date/time information storage portion 111, a country ID code storage portion 112 to store the country ID code for the wireless communication apparatus 10, a country-based usable band storage portion 113, a band group setting portion 115, and a beacon information setting portion 116.

The first antenna 101A and the second antenna 101B possess functions to act as the transmitting portion and the receiving portion for the wireless transmission and reception of signals. Also, a structure may be adopted in which the first antenna 101A or the second antenna 101B is used, depending on the frequency bandwidth, the signal characteristics, or the directivity and so on of the transmitted and received wireless signals. In the example shown in FIG. 8, the wireless communication apparatus 10 includes more than one antenna, but the wireless communication apparatus 10 may include one antenna only.

The high frequency processing portion 102 converts a signal received from the first antenna 101A or the second antenna 101E in to a baseband signal, and converts a baseband signal for transmission in to a high frequency signal. The high frequency processing portion 102 can convert a baseband signal in to a high frequency signal in the band group (wireless channel) set up by the band group setting portion 115.

The receiving PHY baseband processing portion 103 extracts the information in the beacon frame from the signal converted by the high-frequency processing portion 102, and outputs the extracted information to the beacon information analysis portion 105. The transmitting PHY baseband processing portion 104 converts the information to be included in the beacon frame in to a baseband signal through processing of a predetermined physical layer, and outputs the baseband signal to the high-frequency processing portion 102.

The information stored in the beacon frame transmitted by the other wireless communication apparatus 11 is input from the receiving PHY baseband processing portion 103 to the beacon information analysis portion, and, based on the information included in the beacon frame, the beacon information analysis portion 105 performs processing, including synchronization with the other wireless communication apparatus 11 (for example, superframe synchronization), parameter conversion and the like.

The country ID code extraction portion 106 acts as an extraction portion that extracts the country ID code included in the beacon frame and outputs the extracted code to the country ID code conformity determination portion 107. For example, the country ID code extraction portion 106 refers to the beacon frame, and outputs the country ID code set up by the other wireless communication apparatus 11 to the country ID code conformity determination portion 107, along with the user settings information 706, the input date/time information 707 and the received date/time information 708 (see FIG. 7 for details).

The country ID code conformity determination portion 107 determines whether or not the country ID code set up by the other wireless communication apparatus 11 conforms with the country ID code set up in the wireless communication apparatus 10 (the country ID code being stored in the country ID code storage portion 112). Also, the country ID code conformity determination portion 107, based on the user settings information 706 included in the beacon frame transmitted by the other wireless communication apparatus 11, determines whether the country ID code set up in the other wireless communication apparatus 11 was manually input by the user or not.

If the country ID code conformity determination portion 107 determines that the country ID code set up in the other wireless communication apparatus 11 differs from the country ID code set in the wireless communication apparatus 10, the set-up date/time information determination portion 108 compares the date and time information. Specifically, the set-up date/time information determination portion 108 ascertains the time at which the country ID code was set up in the other wireless communication apparatus 11, based on the input date/time information or the received date/time information, and determines the chronological relationship between the ascertained time and the set-up time for the country ID code in the wireless communication apparatus 10 (the time at which the country ID code was recorded in the country ID code storage portion 112).

In addition, the set-up date/time information determination portion 108 possesses functions to act as a time determination portion that determines whether or not a predetermined time period has elapsed from the time at which the wireless communication apparatus 10 country ID code was set up. In the same way, the set-up date/time information determination portion 108 determines whether or not a predetermined time period has elapsed from the time at which the other wireless communication apparatus 11 country ID code was set up. The above-mentioned predetermined time period may be a time period established in advance, for example, 8 hours, 1 day, 1 month or 1 year, or may be a dynamic value calculated from country ID code changes or the like logged on the wireless communication apparatus 10 in the past. For example, the predetermined time period may be set up such that the higher the frequency of changes to the country ID code in the wireless communication apparatus 10, the lower is the value of the predetermined time period.

The display interface 109 includes a screen generating portion (not shown in the figures) that generates a country ID code input screen as needed, and a display portion (not shown in the figures) that displays the country ID code input screen generated by the screen generation portion. If, for example, a country ID code is not set in the wireless communication apparatus 10 at the start-up of the wireless communication apparatus 10, or if, at the start-up of the wireless communication apparatus 10, a predetermined period of time has elapsed from the time at which the wireless communication apparatus 10 country ID code was set up, the display interface 109 may display the country ID code input screen.

Here, if the predetermined time period is set in accordance with the frequency at which the country in which the wireless communication apparatus 10 is located changes, the country ID code generally indicates the country in which the wireless communication apparatus 10 is located while within the predetermined time period from the time at which the setting was made. On the other hand, if the predetermined time period has elapsed from when the setting was made, the country ID code sometimes indicates a country that differs from the country in which the wireless communication apparatus 10 is located. If, at the start-up of the wireless communication apparatus 10, the predetermined time period has elapsed since the time at which the wireless communication apparatus 10 country ID code was set up, the display interface 109 displays the country ID code input screen and prompts the user to input the country ID code, thus realizing input of a highly reliable country ID code.

The display interface 109 may also display the country ID code input screen if the country ID code conformity determination portion 107 determines that the country ID code set up in the other wireless communication apparatus 11 differs from the wireless communication apparatus 10 country ID code. The display interface 109 may also display the country ID code input screen if the country ID code conformity determination portion 107 determines that the country ID code set up in the other wireless communication apparatus 11 differs from the wireless communication apparatus 10 country ID code and the country ID codes for both the wireless communication apparatus 10 and the other wireless communication apparatus 11 were set up based on manual input by the user.

When the country ID code conformity determination portion 107 determines that the country ID code set up in the other wireless communication apparatus 11 differs from the wireless communication apparatus 10 country ID code, it is often difficult to determine which of the country ID codes is correct. Here, when the country ID code conformity determination portion 107 determines that the country ID code set up in the other wireless communication apparatus 11 differs from the wireless communication apparatus 10 country ID code, the display interface 109 displays the country ID code input screen and prompts the user to input the country ID code. It can therefore be expected that the user will input the country ID code indicating the country in which the wireless communication apparatus 10 is currently located.

The input interface 110 possesses functions to act as an operating portion, for the user to perform information input operations in relation to the wireless communication apparatus 10 or to detect designated operations. The input interface 110 detects, for example, the input operation when the user inputs the country ID code. This type of input interface 110 may be a device for the user to input information, such as a mouse, a keyboard, a touch panel, a button or buttons, a microphone, a switch or switches, or a lever or the like.

The date/time information storage portion 111 includes a date/time information memory portion (not shown in the figures) that stores set-up date/time information, including the input date/time information 707 and the received date/time information 708 relating to the wireless communication apparatus 10 explained above with reference to FIG. 7, and a date/time information recording portion (recording portion) (not shown in the figures) that records the set-up date/time information in to the date/time information memory portion. For example, the date/time information recording portion may record the time that the country ID code was input by the user via the input interface 110 in to the date/time information memory portion, or may record the time at which the country ID code was recorded in to the country ID code storage portion 112 in to the date/time information memory portion.

The date/time information memory portion may be, for example, a non-volatile memory such as an electronically erasable programmable read-only memory (EEPROM), an erasable programmable read-only memory (EPROM), or the like, a magnetic disk such as a hard disk, a flexible disk, or the like, an optical disk such as a compact disc recordable (CD-R), a compact disc rewritable (CD-RW), a digital versatile disc recordable (DVD-R), a digital versatile disc rewritable (DVD-RW), a dual-layer digital versatile disc recordable (DVD+R), a dual-layer digital versatile disc rewritable (DVD+RW), a digital versatile disc random access memory (DVD-RAM), a Blu-Ray™ disc recordable (BD-R), a dual-layer Blu-Ray™ disc recordable (BD-RE), or the like, or a magneto-optical (MO) disk.

The country ID code storage portion 112 includes a country ID code memory portion that stores the country ID code 704 relating to the wireless communication apparatus 10 explained above with reference to FIG. 7, and a country ID code recording portion (recording portion) that records the country ID code 704 relating to the wireless communication apparatus 10 explained above with reference to FIG. 7 in to the country ID code memory portion. For example, the country ID code recording portion may record the country ID code input by the user via the input interface 110 in to the country ID code memory portion.

The country ID code recorded in the country ID code memory portion is handled as the country ID code set up in the wireless communication apparatus 10, and the recording of the country ID code in to the country ID code memory portion is handled as the setting up of the wireless communication apparatus 10 country ID code. The country ID code memory portion may be a memory medium in the same way as the above-described date/time information memory portion and may be integrated with the date/time information memory portion.

In addition, if a country ID code is not recorded in the country ID code memory portion, or if the predetermined time period has elapsed from the time at which the country ID code was recorded in the country ID code memory portion, the country ID code recording portion may record the country ID code set up in the other wireless communication apparatus 11 in to the country ID code memory portion. Alternatively, if the wireless communication apparatus 10 is operating dependent on, the country ID code received from the other wireless communication apparatus 11, the country ID code recording portion may record the country ID code received from the other wireless communication apparatus 11 in to the country ID code memory portion.

If the country ID code recording portion records the country ID code in to the country ID code memory portion based on input by the user via the input interface 110, the fact that the country ID code has been recorded via manual input by the user may also be recorded.

The country-based usable band storage portion 113 stores the band groups that can be used in each country, extracts the band group or band groups that can used in the country indicated by the country ID code recorded in the country ID code storage portion 112, and outputs to the band group setting portion 115.

The band group setting portion 115 functions as a channel setting portion that sets the wireless channel to be used for wireless communication from one of the usable band groups that have been input from the country-based usable band storage portion 113, sets the wireless channel frequency hopping pattern, and outputs the set band group and frequency hopping pattern to the high frequency processing portion 102.

If the country ID code conformity determination portion 107 determines that the country ID code set up in the other wireless communication apparatus 11 differs from the wireless communication apparatus 10 country ID code, the band group setting portion 115 may set the wireless channel to sub-bands that can be universally used in all countries. According to the present structure, it is possible to perform normal wireless communication even when it is difficult to determine which is correct of the country ID code set up in the other wireless communication apparatus 11 or the wireless communication apparatus 10 country ID code.

Also, at the start-up of the wireless communication apparatus 10, if the set-up date/time information determination portion 108 determines that the predetermined time period has not elapsed since the time at which the country ID code was set in the wireless communication apparatus 10, the band group setting portion 115 may set the wireless channel to be used for the wireless communication based on the band group output by the country-based usable band storage portion 113, that output being based on the country ID code recorded in the country ID code storage portion 112.

Here, if the predetermined time period is set in accordance with the frequency at which the country where the wireless communication apparatus 10 is located changes, within the predetermined time period from when the set-up was made, the country ID code generally indicates the country in which the wireless communication apparatus 10 is located. On the other hand, if the predetermined time period has elapsed from when the set-up was made, the country ID code sometimes indicates a country that differs from the country in which the wireless communication apparatus 10 is located. Therefore, according to the wireless communication apparatus 10 that operates based on whether the predetermined period of time has elapsed or not from the time at which the country ID code was set, wireless communication can be performed using an appropriate band group based on a highly reliable country ID code.

The beacon information setting portion 116 can generate an information element based on the information stored in the date/time information storage portion 111 and the country ID code storage portion 112, and can add the information element to the beacon when necessary. Any of the blocks shown in FIG. 8 may be integrated or deleted as necessary, or may be further segmentalized. New blocks may also be added. The wireless communication apparatus 11 is at least one wireless communication apparatus that exists peripherally to the wireless communication apparatus 10. As the structure of the wireless communication apparatus 11 can be essentially identical to that of the wireless communication apparatus 10, an explanation of the wireless communication apparatus 11 is omitted here.

The structure of the wireless communication apparatus 10 according to the present embodiment has been explained with reference to FIG. 8. Next, the wireless communication method using the wireless communication apparatus 10 will be explained with reference to FIG. 9 and FIG. 10.

Figure 9:
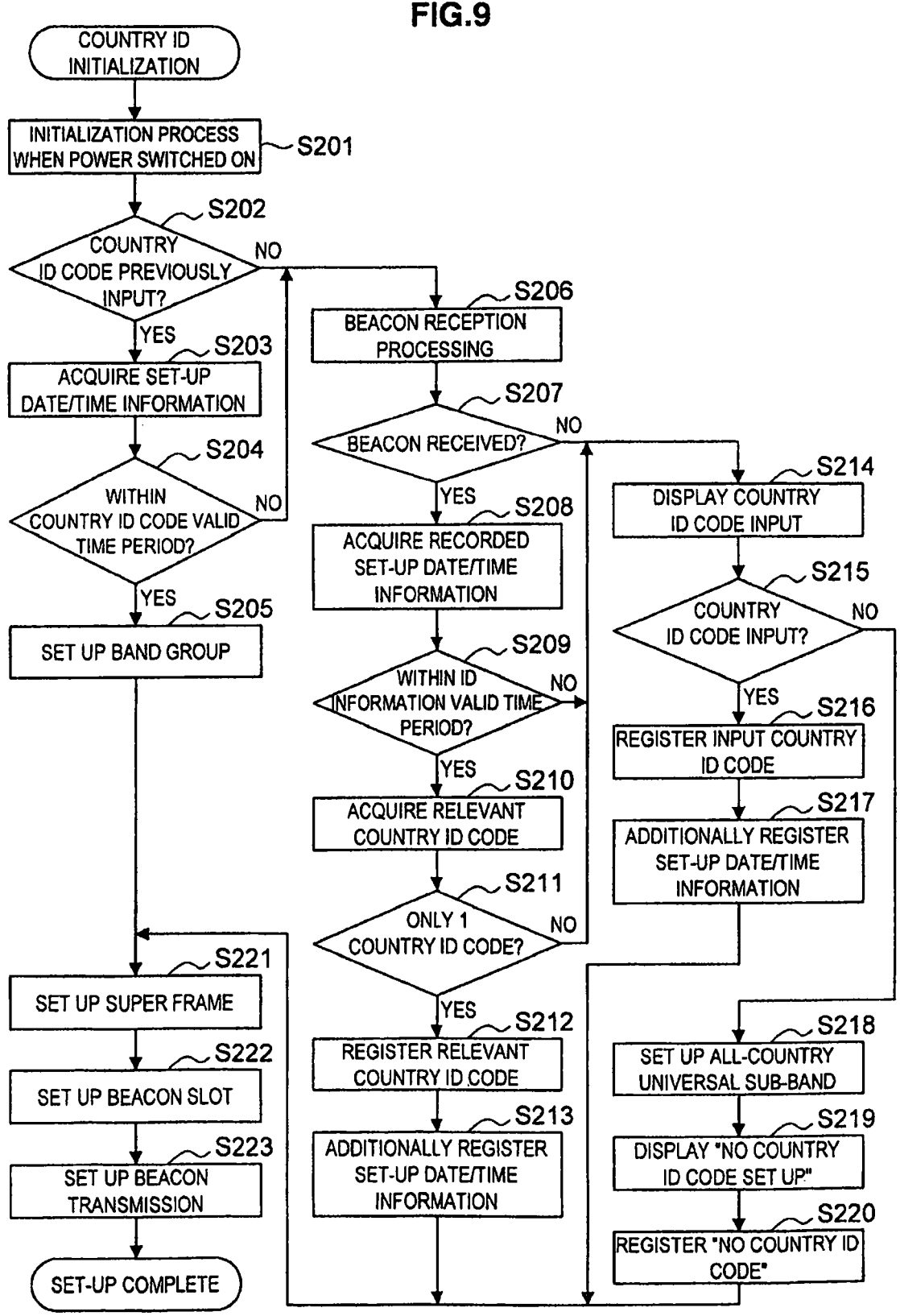
FIG. 9 is a flowchart showing the flow of a wireless communication method executed at the start-up of the wireless communication apparatus according to the first embodiment.

FIG. 9 is a flowchart showing the flow of a wireless communication method executed at the start-up of the wireless communication apparatus 10. When the power is switched on, the wireless communication apparatus 10 first performs an initialization process (step S201), Next, the wireless communication apparatus 10 set-up date/time information determination portion 108 determines whether or not a country ID code has previously been recorded in the country ID code storage portion 112 (step S202). If it determines that a country ID code has been recorded, the set-up date/time information determination portion 108 acquires set-up date/time information from the date/time information storage portion 111 (step S203), and determines whether the predetermined time period has elapsed or not since the time at which the country ID code was set. In other words, it determines whether or not the country ID code is within a valid time period or not (step S204).

If it is determined in step S204 that the country ID code is within the valid time period, the band group setting portion 115 sets the wireless channel to a band group that can be used in the country indicated by the country ID code recorded in the country ID code storage portion 112 (step S205).

If it is determined in step S202 that a country ID code has not previously been recorded in the country ID code storage portion 112, the first antenna 101A or the second antenna 101B receive a beacon from the other wireless communication apparatus 11 (step S206). Next, if a beacon has been received in step S206, the beacon information analysis portion 105 and the country ID code extraction portion 106 acquire the set-up date/time information included in the beacon, such as the input date/time information or the received date/time information etc. (step S207 and step S208).

Then, the set-up date/time information determination portion 108, based on the set-up date/time information acquired in step S208, determines whether the country ID code set in the other wireless communication apparatus 11 is within the valid time period or not (step S209). If it is determined that the country ID code set in the other wireless communication apparatus 11 is within the valid time period, the beacon information analysis portion 105 and the country ID code extraction portion 106 acquire the country ID code set in the other wireless communication apparatus 11 (step S210).

After that, if there is only one country ID code set in the other wireless communication apparatus 11 (step S211), the country ID code storage portion 112 records the country ID code set in the other wireless communication apparatus 11 (step S212). Next, the date/time information storage portion 111 records the received set-up date/time information (step S213).

If a beacon was not received in step S206, the display interface 109 displays a country ID code input screen (step S207 and step S214). Then, if the country ID code was manually input by the user via the input interface 110, the country ID code storage portion 112 records the manually input country ID code (step S215 and step S216). Further, the date/time information storage portion 111 records the country ID code set-up date/time information (step S217).

If no country ID code was input using the country ID code input screen displayed by the display interface 109 in step S214, the band group setting portion 115 sets the wireless channel to sub-bands that can be universally used in all countries (step S218). Then the display interface 109, as necessary, generates a display indicating that no country ID code has been set (step S219), and the country ID code storage portion 112 records "no country ID code" as the country ID code (step S220).

After step S205, after step S213, or after step S220, the wireless communication apparatus 10 sets up a super frame (step S221), sets up the beacon slot for the wireless communication apparatus 10 to receive a beacon (step S222), and sets up beacon transmission (step S223).

Figure 10:
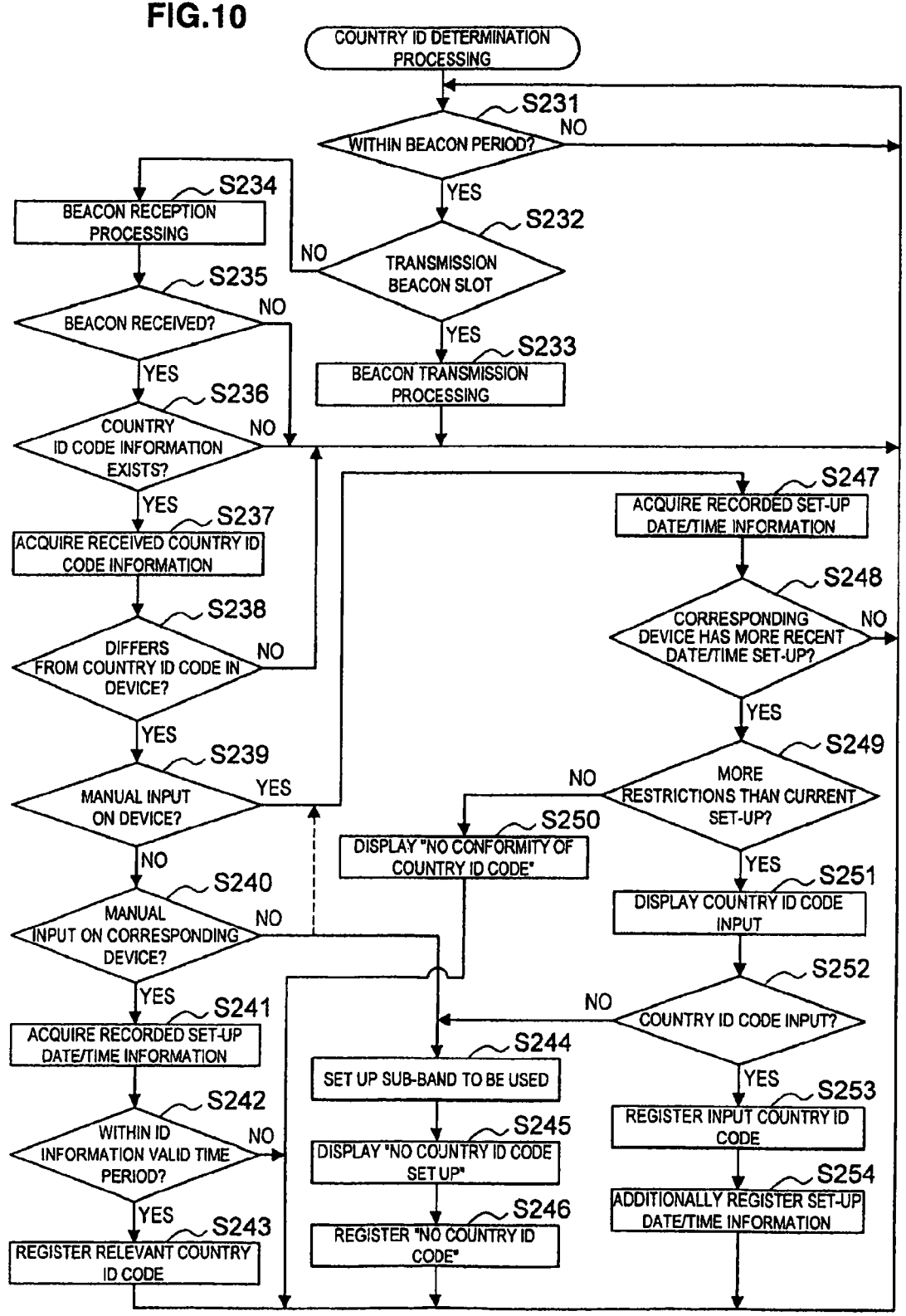
FIG. 10 is a flowchart showing the flow of a wireless communication method for the operation stages after the start-up process is completed for the wireless communication apparatus according to the first embodiment.

FIG. 10 is a flowchart showing the flow of a wireless communication method relating to the operation stages after the start-up process is completed for the wireless communication apparatus 10. Specifically, FIG. 10 shows the flow of the wireless communication method in relation to the stages of an ad hoc network that operates by the periodic exchange of beacons.

First, if the wireless communication apparatus 10 is currently in a beacon period, when the beacon slot set as the time slot to transmit the beacon by the wireless communication apparatus 10 arrives, the wireless communication apparatus 10 transmits a beacon including information elements that include the country ID code stored in the country ID code storage portion 112 and the set-up date/time information stored in the date/time information storage portion 111 (step S231, step S232 and step S233). If the wireless communication apparatus 10 is not currently in a beacon period, and after the beacon has been transmitted in step S233, the wireless communication apparatus 10 returns to the step S231 process.

During a beacon period, if there is no beacon slot from the wireless communication apparatus 10, the first antenna 101A or the second antenna 101B receives a beacon from the other wireless communication apparatus 11 (step S234). When the beacon is received in step S234, if country ID code information element is included in the received beacon, the country ID code extraction portion 106 extracts the country ID code from the beacon (step S235 to step S237).

Next, the country ID code conformity determination portion 107 determines whether or not the country ID code extracted by the country ID code extraction portion 106 differs from the country ID code set up in the wireless communication apparatus 10 (step S238). If the country ID code conformity determination portion 107 determines that the country ID code extracted by the country ID code extraction portion 106 differs from the country ID code set up in the wireless communication apparatus 10, it then determines whether or not the country ID code set up in the wireless communication apparatus 10 was manually input by the user (step S239).

If the country ID code set up in the wireless communication apparatus 10 is determined not to have been manually input by the user, it is next determined whether or not the country ID code set in the corresponding wireless communication apparatus 11 has been manually input by the user (step S240). If it is determined that the country ID code set in the corresponding wireless communication apparatus 11 has been manually input by the user, the country ID code extraction portion 106 extracts the country ID code set-up date/time information from the beacon transmitted by the wireless communication apparatus 11 (step S241).

Then, based on the wireless communication apparatus 11 country ID code set-up date/time information extracted by the country ID code extraction portion 106, the set-up date/time information determination portion 108 determines whether or not the wireless communication apparatus 11 country ID code is within the valid time period (step S242). The set-up date/time information determination portion 108 may also determine the chronological relationship between the time at which the wireless communication apparatus 11 country ID code was set up and the time at which the wireless communication apparatus 10 country ID code was set up.

If the set-up date/time information determination portion 108 determines that the wireless communication apparatus 11 country ID code is within the valid time period, the country ID code storage portion 112 records and sets up the wireless communication apparatus 11 country ID code as the wireless communication apparatus 10 country ID code (step S243). As a result, the band group setting portion 115 can set the wireless channel to a band group that can be used in the country indicated by the wireless communication apparatus 11 country ID code. If the set-up date/time information determination portion 108 determines that the wireless communication apparatus 11 country ID code is not within the valid time period, operations continue based on the country ID code set up in the wireless communication apparatus 10. Alternatively, in step S243, the country ID code storage portion 112 may record and set as the wireless communication apparatus 10 country ID code whichever country ID code was more recently set up of the wireless communication apparatus 11 country ID code and the wireless communication apparatus 10 country ID code.

In step S240, if the country ID code set up in the corresponding wireless communication apparatus 11 is determined not to be based on manual input by the user, the band group setting portion 115 sets the wireless channel to sub-bands that can be universally used in all countries (step S244). Then, as necessary, the display interface 109 indicates that the country ID code information has not yet been set up (step S245) and the country ID code storage portion 112 records "no country ID code" as the country ID code (step S246). Alternatively, the system may be set up so that the same processing as the branch described below can be performed, as shown by the dashed line in FIG. 10.

Also, in step S239, if the country ID code set up in the wireless communication apparatus 10 is determined to be based on manual input by the user, the country ID code extraction portion 106 extracts the country ID code set-up date/time information from the beacon transmitted by the wireless communication apparatus 11 (step S247). Then, the date/time information determination portion 108 determines which of the set-up date/time information is more recent, that of the corresponding wireless communication apparatus 11 or that of the wireless communication apparatus 10 (step S248). If the set-up date/time information of the corresponding wireless communication apparatus 11 is determined to be more recent, and if there are fewer restrictions relating to the band group that can be used with the wireless communication apparatus 11 country ID code than with the country ID code currently set up in the wireless communication apparatus 10 (step S249), the display interface 109 indicates that there is no conformity between the country ID codes (step S250). Then, the wireless communication apparatus 10 continues operations based on the country ID code currently set in the wireless communication apparatus 10.

If the set-up date/time information of the corresponding wireless communication apparatus 11 is determined to be more recent, and if there are greater restrictions relating to the band group that can be used with the wireless communication apparatus 11 country ID code than with the country ID code currently set up in the wireless communication apparatus 10, the display interface 109 displays the country ID code input screen (step S251). Then, if the country ID code is manually input by the user via the input interface 110, the country ID code storage portion 112 records the manually input country ID code (step S252 and step S253).

Further, the date/time information storage portion 111 records the country ID code set-up date/time information (step S254). If the country ID code is not manually input by the user via the input interface 110, the band group setting portion 115 sets the wireless channel to sub-bands that are common to both the band group or band groups that can be used in the country indicated by the wireless communication apparatus 11 country ID code and to the band group or band groups that can be used in the country indicated by the wireless communication apparatus 10 country ID code (step S244).

If the beacon received by the wireless communication apparatus 10 does not include a country ID code for a country that is not the same as the wireless communication apparatus 10 country ID code, or if the identical country ID code in the wireless communication apparatus 10 is set in the wireless communication apparatus 11 and the set-up date/time information for the wireless communication apparatus 10 is more recent, the wireless communication apparatus 10 continues operations based on the country ID code set up in the wireless communication apparatus 10. Also, after the series of processes shown in FIG. 10 to once more set up the country ID code is complete, or if not within the beacon period, the series of processes are exited, and processes are not executed until the country ID code determination process is performed by once more receiving a beacon.

As explained above, the wireless communication apparatus 10 according to the present embodiment can perform wireless communication using a band group based on the legal prescriptions of the country in which the wireless communication apparatus 10 is located and can form part of an ad hoc network. Also, the wireless communication apparatus 10, by operating based on a time period elapsed from the time at which the country ID code is set up, can perform wireless communication using an appropriate wireless channel based on a highly reliable country ID code. Also, as the wireless communication apparatus 10 can operate according to the country ID code of the peripheral wireless communication apparatus 11, it can perform operations in the country in which it is located without a device for inputting the country ID code in to the wireless communication apparatus 10.

In addition, if the country ID code set up in the wireless communication apparatus 10 differs from the country ID code set up in the wireless communication apparatus 11, the band groups set up are the band groups that can be used in both the countries indicated by each of the country ID codes, thus preventing illegitimate radio waves from crossing national borders. Further, if the country ID code set up in the wireless communication apparatus 10 and the country ID code set up in the peripheral wireless communication apparatus 11 are not geographically continuous, the wireless communication apparatus 10 displays the country ID code input screen and prompts manual input by the user, thus minimizing intentional transmission of signals using a band group that should not be used.

Also, as the wireless communication apparatus 10 transmits beacons that include set-up date/time information, it is possible to determine which country ID code has most recently been set up, that of the wireless communication apparatus 10 or that of other wireless communication apparatuses, including the peripheral wireless communication apparatus 11. Additionally, based on the set-up date/time information in the wireless communication apparatus 10, it is possible to determine whether or not it is possible to use band groups (frequency bandwidths) for which use is approved based on time restrictions.

It should be understood by those skilled in the art that various modifications, combinations, sub-combinations and alterations may occur depending on design requirements and other factors insofar as they are within the scope of the appended claims or the equivalents thereof.

For example, if the wireless communication apparatus 10 country ID code and the peripheral wireless communication apparatus 11 country ID code are not geographically continuous, the wireless communication apparatus 10 may be structured to stop operations if the country ID code is not manually input by the user within a specific time period. The present structure offers the benefit of preventing or stopping wireless communication using an illegitimate band group.

Each of the steps performed by the wireless communication apparatus 10 of the present specification do not necessary need to be performed chronologically and in the order noted on the flow charts, but may include processing performed in parallel or individually (for example, parallel processing or object processing).

Also, a computer program may be provided that causes the hardware built in to the wireless communication apparatus 10, including the CPU, ROM and RAM and the like, to perform the same functions as each member of the wireless communication apparatus 10 structure described above. A recording medium is also provided that stores the computer program. Each of the functional blocks shown in the functional block diagram in FIG. 8 can be formed by hardware, and the series of processes can also be realized by hardware.

What is claimed is:

1. A first electronic device comprising:
   circuitry configured to:
   store or extract first country ID information, the first country ID information indicating at least one of a first international region, a first country being included in the first international region, a first in-country region being included in the first country;
   control receiving a signal from a second electronic device, the signal including second country ID information indicating at least one of a second international region, a second country being included in the second international region, a second in-country region being included in the second country; and
   perform wireless communication by a frequency channel selected from available band group based on the first country ID information and the second country ID information.

2. The first electronic device of claim 1, wherein the available band group indicates one or more frequency bands available for each country.

3. The first electronic device of claim 2, wherein the available band group further indicates one or more sub-bands, each sub-band having similar bandwidth regardless of country.

4. The first electronic device of claim 3, wherein the wireless communication is device-to-device communication formed without a base station.

5. The first electronic device of claim 4, wherein the device-to-device communication is a type of ad hoc communication.

6. The first electronic device of claim 1, wherein the frequency channel is selected as a frequency channel band that is allowed to be used in both a first country associated with the first country ID information and a second country associated with the second country ID information.

7. The first electronic device of claim 1, wherein the circuitry is further configured to store and extract first time information at which the first country ID information is stored, and the frequency channel is set in consideration of the first time information.

8. The first electronic device of claim 7, wherein the signal further includes second time information associated with the second country ID information, and the frequency channel is set in consideration of both the first time information and the second time information.

9. The first electronic device of claim 1, wherein the signal further includes second time information associated with the second country ID information, and the frequency channel is set in consideration of the second time information.

10. The first electronic device of claim 1, wherein the first country ID information comprises one or more of: an element ID, an information length, an international region code, a country ID code, an in-country region ID code, user settings information, input date/time information, received date/time information, power supply information, or temporary restriction on use information.

11. The first electronic device of claim 1, wherein the signal is a beacon signal.

12. The first electronic device of claim 11, wherein the beacon signal further comprises one or more of: header information, a header check sequence, beacon parameters, one or more information elements, or a frame check sequence.

13. A method performed by a first electronic comprising:
    storing or extracting first country ID information, the first country ID information indicating at least one of a first international region, a first country being included in the first international region, a first in-country region being included in the first country;
    controlling receiving a signal from a second electronic device, the signal including second country ID information indicating at least one of a second international region, a second country being included in the second international region, a second in-country region being included in the second country; and
    performing wireless communication by a frequency channel selected from available band group based on the first country ID information and the second country ID information.

* * * * *